US005949008A

United States Patent [19]

Augsburger

[11] Patent Number: 5,949,008

[45] Date of Patent: Sep. 7, 1999

[54] RAIL AND SYSTEM FOR SUPPORTING DRUMS AND OTHER PERCUSSION MUSICAL INSTRUMENTS

[76] Inventor: Brad Augsburger, 16111 Chastain Rd., Odessa, Fla. 33556

[21] Appl. No.: 08/949,110

[22] Filed: Oct. 10, 1997

[51] Int. Cl.[6] .......... G01D 13/02

[52] U.S. Cl. .......... 84/421

[58] Field of Search .......... 84/421

[56] References Cited

U.S. PATENT DOCUMENTS

| | | | |
|---|---|---|---|
| 3,945,291 | 3/1976 | Zickos | 84/421 |
| 4,441,398 | 4/1984 | Baker | 84/421 |
| 4,479,414 | 10/1984 | Willis | 84/421 |
| 4,605,144 | 8/1986 | LaFlame | 224/265 |
| 5,182,416 | 1/1993 | Schwiezer | 84/723 |
| 5,337,645 | 8/1994 | Johnston | 84/421 |
| 5,337,646 | 8/1994 | Austin | 84/421 |

*Primary Examiner*—William M. Shoop, Jr.
*Assistant Examiner*—Shih-yung Hsieh
*Attorney, Agent, or Firm*—Pendorf & Cutliff

[57] ABSTRACT

A support rack and system for holding a plurality of percussion instruments, such as drums, and accessories, and comprising: a first upright; a second upright; a generally horizontal arcuate rail member extending between the first upright and second upright; a bass arm member having a first bass arm end and a second bass arm end; a first linkage means for releasably securing the first bass arm end to the rail member; and a second linkage means adapted for releasably securing the second bass arm end to a bass drum, such that when the rack for supporting percussion instruments and accessories is secured to the bass drum, the two uprights and the bass drum, via the bass arm member, maintain the generally horizontal arcuate rail member on a horizontal plane above the bass drum.

15 Claims, 10 Drawing Sheets

RAIL AND SYSTEM FOR SUPPORTING DRUMS AND OTHER PERCUSSION MUSICAL INSTRUMENTS

BACKGROUND OF THE INVENTION

1. Field of the Invention

The present invention relates generally to rails for positioning and holding musical instruments and, more particularly, to a support rack and system for holding a plurality of percussion instruments, such as drums, and accessories.

2. Description of the Related Art

A modern percussion artist may resort to a variety of drums, cymbals, and related acoustic and electronic instruments in order to have a full vocabulary. However, in order to be playable, each percussion instrument must be placed within easy striking range. Each electrical instrument must be wired, and all electrical cabling should be neatly arranged.

Most frequently, each separate drum or percussion instrument is supported by a separate stand having a tripod like structure. Numerous individual stands can result in a crowded, cluttered appearance due to the confined area in which such stands or holders are positioned. The use of numerous individual drum stands has the further disadvantage of complicating setup, which can result in much time expenditure, particularly for a band on tour which may have to set up in a different location every day. Such a setup does not lend itself to being wired.

Frequently, several smaller drums are mounted on top of, and/or on either side of a relatively large bass drum. While this helps somewhat in compacting and stabilizing the drum setup, the setup remains generally loose and fractionated.

Recently drum racks have been developed in order to help eliminate the crowding and clutter of individual stands. For example, U.S. Pat. No. 3,945,291 (Zickos) discloses a framework of straight metal rods for supporting a drum assembly. The drums are supported entirely by a "pup-tent" shaped framework. However, due to the inherent lack of strength of straight metal rods, this framework will bend and deform and will not give the feel of a solid support. The stand is not designed for wiring.

U.S. Pat. No. 4,479,414 (Willis) teaches a drum support assembly for supporting multiple drums. The assembly is heavy and complex and would appear to increase the time needed to set up drums. The stand is also not designed for an electronic environment.

U.S. Pat. No. 5,337,646 (Austin) discloses a drum mounting rack of which the drum supporting rack is generally arched over about 180%. A percussion artist can sit inside the arc and select from and play a large variety of instruments within his striking range. The rack incorporates a bass drum as part of the support structure at about the midpoint of the arc, with the bass drum serving as one "leg" and two rack ends at the respective ends of the arc forming two other "legs" for a tripod arrangement. However, the two legs at the ends of the arc are connected by a transverse connecting rod such that the rack, when viewed from above, forms a large "D". This connecting rod interferes with the movement or footwork of the drummer. Another shortcoming of this rack is that the bass drum must necessarily be placed within a narrow distance of the stand, actually being directly attached to the main rack of the support structure. This minimizes flexibility in the placement of the bass drum. This can especially be a problem where additional percussion, sound, or other performance related equipment must be positioned near the drum mounting rack structure. Yet another problem with the design of this rack is the use of two horizontal parallel bar members. Mounting drums with multiple attachment points reduces the stability of the setup by increasing the number of points subject to vibrational stresses. This also has a potential negative impact on instrument sound quality. Furthermore, wires from electrical equipment and instruments are not accommodated or hidden in the Austin disclosure.

Although a number of drum racks have been developed, there remains a need in the art for an improved drum rack which makes possible the easy and accurate setting up of both acoustic and electronic instruments, whereon each individual instrument is firmly held in it's desired position, wherein wiring is secured in a manner to prevent short circuits and distortion and in a manner that is visually appealing, and wherein there is minimal cross vibration between the instruments and optimal musical and acoustical qualities of the sound produced by the instruments.

There is also a need for an improved percussion instrument rack which allows for the positioning of one or more bass drums without limiting access to other percussion instruments and performance related equipment.

There is also a need for an improved percussion instrument support rack which allows for flexible positioning of drums at a desired distance from the floor. For example, a Floor Tom sits lower than other drums. Under the prior art, it is difficult to mount Floor Toms on the horizontal rack of a drum rack or drum support assembly at an appropriate height.

There is also a need for an improved percussion instrument support rack which allows for the positioning of equipment and or percussion instruments at the ends of the support rack. Under the current drum rack art, positioning of drums at the ends of the drum rack, on the horizontal bar, is difficult if not impossible for many types of drums, due to physical interference by the rack's vertical legs.

SUMMARY OF THE INVENTION

In view of the numerous disadvantages of conventional drum racks, it is an object of the invention to provide a means for optimizing the acoustic and electronic instrument layout for a percussion instrument setup.

It is yet another object of the present invention to provide a drum support rack which effectively hides cables and wires from electrical equipment so as to avoid the appearance of clutter.

A further object of the present invention is to provide an improved drum mounting rack whereby each individual drum and/or percussion instrument, and each bass drum, may be firmly held in desired positions, with minimal cross vibration and optimal musical and acoustical qualities of the sound produced by the instruments.

A further object of the present is to provide an improved drum mounting rack whereby flexibility as to bass drum placement is provided.

It is yet a further object of the invention to provide a rack design which can accommodate mounting brackets for easily and stably mounting acoustic and electronic instruments or other apparatus in desired positions on the drum rack of the present invention having at least one horizontal rail member.

Further, it is an object of the present invention to provide a rack design which can accommodate drums and percussion instruments at the ends of the rack.

Further, it is an object of the present invention to provide a rack design which can accommodate drums and percussion instruments at varying heights above the floor.

A further object of the present invention is to provide a rack for supporting drums, percussion instruments (e.g. cymbals, cow bells, pads, guiro, etc. . . . ), or other apparatus (e.g., microphones), and bass drums, in desired positions so as to be readily accessible for use by a drummer during a musical performance.

Still further, an object of the present invention is to provide a rack for supporting percussion instruments and accessories that further improves the percussion instrument cluster so that more instruments can be conveniently operated from within a smaller arc.

It is another object of the present invention to accomplish all of the above-mentioned objectives by providing a rack for supporting percussion instruments and accessories which is easy to assemble and disassemble.

After extensive investigation and experimentation, the present inventor has discovered that the objects of the invention can be simply, eloquently, and inexpensively accomplished by means of a rack for supporting percussion instruments and accessories for use in combination with, and partially supported by at least one bass drum, said rack comprising: a vertically flat, generally horizontally extending arcuate rail member; a first upright providing a first attachment point to the rail member; a second upright providing a second attachment point to the rail member; a bass drum; and a linkage means for releasably securing the bass drum to the rail member so that the uprights and bass drum serve to maintain the rail member on a horizontal plane above the bass drum.

The bass drum (s) may be connected to the rail via at least one bass arm member which allows the bass drum (s) to be placed a greater distance from the rail while still being contiguous and securely fastened to the rail. Further, the flexibility in bass drum positioning, and hence in the positioning of other equipment, can be greatly enhanced by allowing the bass arm member to pivot with respect to the rail member, and/or by allowing the length of the bass arm member to be adjustable.

Optionally, any number of rail instrument-accessory support means can be added to the drum support rack so as to allow positioning of various drums and pieces of equipment along the vertically flat rail member.

Further, any number of upright instrument-accessory support means can be attached to the uprights so as to allow the positioning of various drums and equipment along the uprights at an adjustable height above the floor.

Additional advantages of the invention as described above include:

1) an esthetically pleasing appearance is achieved when the drum rack of the present invention is used. The rack avoids a cluttered appearance which exists where individual stands are used for each percussion instrument, drum, or other apparatus.

2) the rail in no way interferes with the musical or percussion qualities of the drums affixed thereto; that is, there is no dampening or deadening effect, nor is there any undesirable stress put on the drum so that it does not achieve its full music potential.

3) the rail is not expensive to manufacture and is simple, yet highly effective.

4) electrical cables can be easily secured to and accommodated by the rack.

In combination with the drum rack of the present invention, where the bass drum can be placed further from the drummer than it is conventionally, one might utilize the extended length bass drum pedal of U.S. Pat. No. 5,509,342. One might also utilize any one of a number of various anchoring devices for bass drums in conjunction with the present invention. However, it should be noted that the weight of the other percussion instruments on the support rack of the present invention serves to eliminate the forward bass drum movement which necessitates some anchoring mechanism. The foregoing has outlined rather broadly the more pertinent and important features of the present invention in order that the detailed description of the invention that follows may be better understood and so that the present contribution to the art can be more fully appreciated. Additional features of the invention will be described in detail hereinafter which form the subject matter of the claims of the invention. It should be appreciated by those skilled in the art that the conception and the specific embodiments disclosed may be readily utilized as a basis for modifying or designing other rack for supporting percussion instruments and accessories for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

For a fuller understanding of the nature and objects of the present invention, reference should be made to the following detailed description taken in with the accompanying drawings in which.

DETAILED DESCRIPTION OF THE INVENTION

The following description and the accompanying drawings are provided to describe and illustrate the present preferred embodiment of the invention. They are not intended to limit the scope of the claims in any way.

One skilled in the art would know to incorporate vibrational damping or padding material into the mounting brackets of the present invention, support rack, in order to minimize cross transmission of vibrational energy among the various drums, instruments, and/or apparatus mounted on the rack rail of the present invention.

A significant feature of the present invention is that the horizontal rail of the support rack is vertically flat. Thus, when used in combination with a horizontal instrument-accessory support means (with an incorporated cable port), it can hide unsightly cables associated with electrical percussion instruments and accessories utilized in proximity with the rack. Another significant feature of the present invention is that the vertically flat, horizontally extending rail does not allow for movement of the instruments which are attached to it via rail support means. When cylindrically shaped horizontals are used, instruments supported thereon are prone to shifting after prolonged beating.

A significant feature of the present invention is the characteristic that the bass drum is attached to a drum rack so as to act as a support for the drum rack not directly, but by an intermediate arm which is free to swivel and extend. This permits staging the bass drum at a greater distance from the percussion artist, frees up valuable space for the placement of other percussion instruments, and allows the bass drum to be positioned at various angles from the drum rack. The invention is also unique in that the rail member of the present invention is not divided into parts, and thus minimizes the likelihood of interference by cross vibrations and other problems which can accompany multiple part support structures. Further, the invention is unique in that the rail and support system are designed so as to be able to position the various percussion instruments or other equipment at any position along the main horizontal rail of the support rack of the present invention, including the very ends of the rail, as well as along the uprights. This provides for maximum flexibility with regards to equipment and instrument positioning. Further, it is a unique feature of the invention that the rack is specially designed to inconspicuously accommodate and conceal electronic instrument cables and wires for a percussion instrument setup.

Figure 1A:
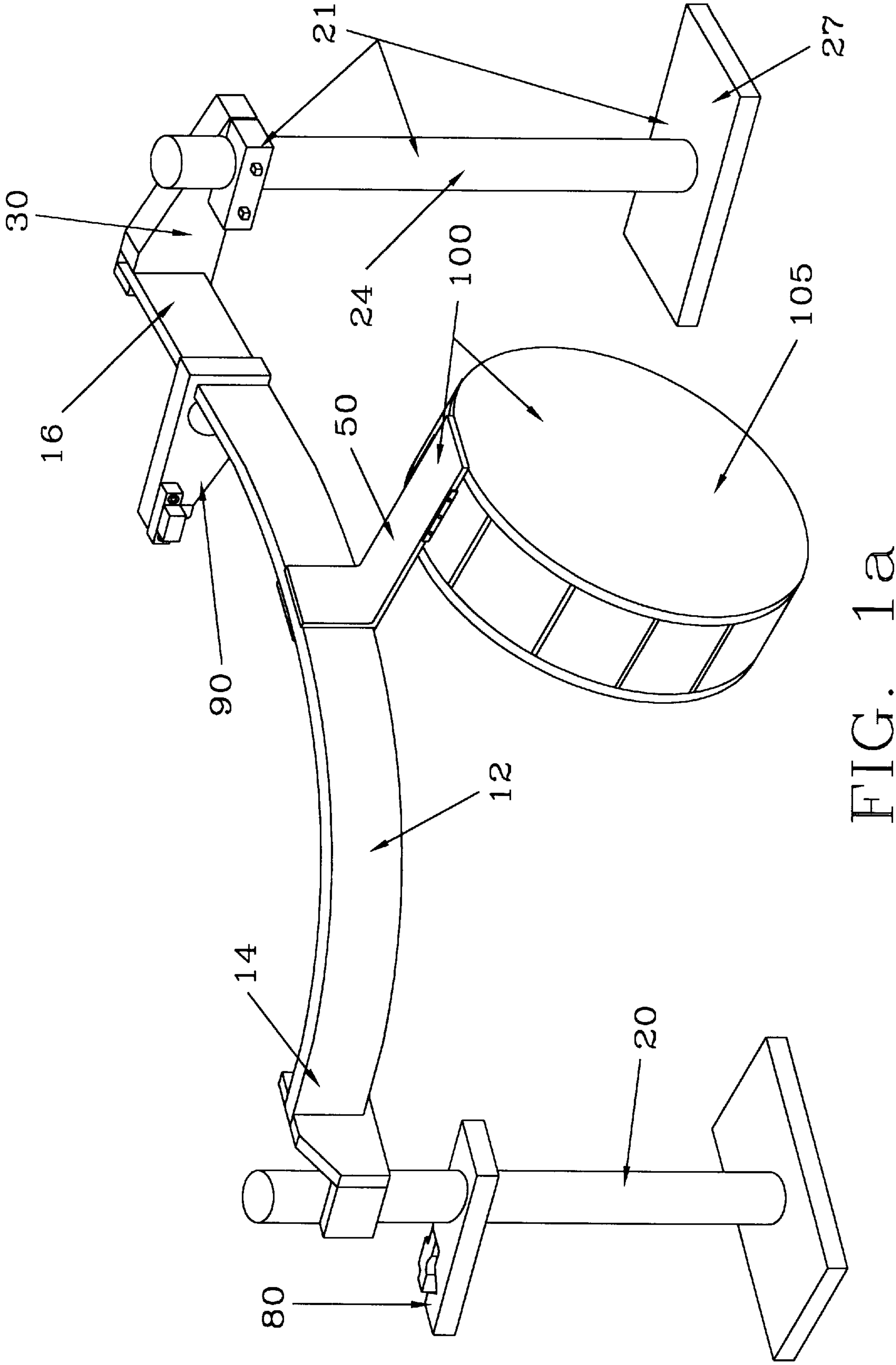
FIG. 1 is a front perspective view of a drum support rack of the present invention capable of having an upright instrument-accessory support means and a rail instrument-accessory support means mounted thereon.
FIG. 1*b* is a front perspective of the present invention containing only the uprights, the rail member, and the bass arm member.
FIG. 1*c* is a partial exploded view of the rail member.

FIG. 1*a* shows a preferred embodiment of a drum support rack of the present invention. The support rack comprises a bar or rail member 12 arcuate in a generally horizontal plane a spaced distance X above an underlying support surface or floor. The rail member has a first rail end 14 and a second rail end 16. Further, the rail member 12 has a height 17 to width 18 ratio (see FIG. 1*c*) of at least 4:1, preferably 10:1, most preferably 8:1. In the preferred embodiment, the length of the rail member 12 is from 32" to 78", most preferably 54".

The flat rail member aids in effectively concealing electrical cords and wires which are routed along the back of the rail. The rail member can describe an arcuate configuration from 30° to 180°. In the preferred embodiment, the rail member describes an arcuate configuration from 40° to 90°. One could easily extend the range of the arc by placing two or more rail members 12 in series. By doing so, one could even create a circular drum support structure whereby the drummer would perform from the center.

In the preferred embodiment, the arcuate rail member 12 is maintained in a horizontal plane above a bass drum 105 via a first and second upright 20, 21 and at least one bass drum assembly 100 comprising a bass arm member 50 and a bass drum 105. The first and second uprights 20, 21 and the at least one bass drum assembly 100 may serve to support the arcuate rail member 12 by being placed at variable locations along the length of the arcuate rail member 12.

Figure 2A:
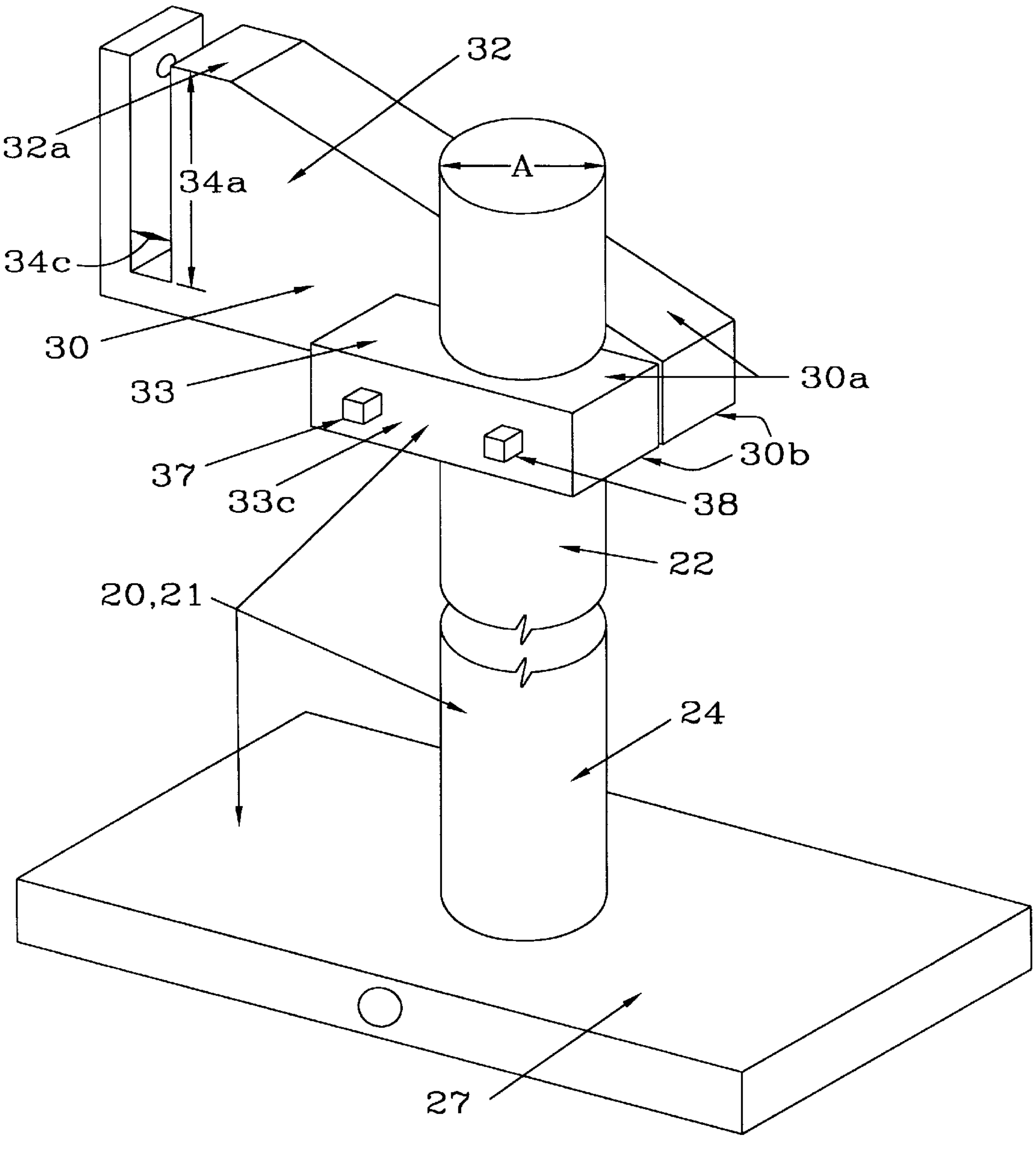
FIG. 2*a* is a partial exploded perspective view of an upright with a rail affixing member of the present invention.

FIG. 2*a* shows the preferred embodiment of the uprights 20, 21 of the present invention. The heights of the uprights range from 22" to 40". In the preferred embodiment, the uprights are 32". The uprights 20, 21 consist of vertical member 22, a base 27 which is attached to the lower end 24 of the vertical member, and a rail affixing member 30. The vertical member 22 is cylindrical in shape and has a circular cross-section A.

Each rail affixing member contains a first and second rail affixing element 32, 33. Each rail affixing element 32, 33 has a groove carved into its side in the shape of a half circle 35, 36, see FIG. 2*b*. The first and second rail affixing elements 32, 33 of the rail affixing members 30, 31 are reversibly attached to one another by two screws 37, 38 which are adjacent to one another in a horizontal plane. The screws 37, 38 enter from the flat side 33*c* opposite the groove (36) of the second rail affixing element 33, pass through the second rail affixing element 33, and traverse into two orifices (not shown) on the side of the first rail affixing element 32 which contains the groove (35). When the screws 37, 38 are tightened, the half circle grooves 35, 36 of the rail affixing elements are aligned and the assembled rail affixing member 30 possesses an orifice 39 which extends from the superior side 30*a* and through the bottom 30*b* of the assembled rail affixing member 30, and has a cross section which is roughly equal to but slightly smaller than the vertical support members' cross section A. The screws 37, 38, which attach the first and second rail affixing elements 32, 33 together, are located on either side of the orifice 39. The rail affixing member 30 connects to the vertical support member 20 by first sliding the first vertical support member 20 through the orifice 39 of the first rail affixing member 30 to a desired position along the length of the vertical support member. FIG. 1 shows the assembly of the preferred embodiment, wherein the rail affixing member is connected to the superior end 23 of the vertical support member. The rail affixing member 30 is then reversibly affixed to the vertical support member 20 by tightening the screws 37, 38 of the rail affixing member 30.

After the uprights are assembled, the arcuate rail member 12 can be attached to the uprights so that the uprights will partially support the rail member at a fixed distance above an underlying support surface. This attachment is made possible by a rectangular groove 34 along the superior side 32*a* of the first rail affixing element 32 of the rail affixing member 30 of the uprights 20, 21. The groove 34 extends downward from the superior side 32*a* of the first rail affixing element 32. The depth 34*a* of the groove 34 is slightly larger than the height 17 of the rail member 12. The width 34*c* of the groove 34 is roughly the same but slightly larger than the width 18 of the rail member 12. Hence, the rail member 12 can be lowered into the grooves 34 of the first rail affixing element 32 of the rail affixing members 30 of the uprights. This attachment mechanism is simple, having a minimal number of attachment elements which need adjusting and thereby minimizing setup and disassembly time. Further, the mechanism has a minimal number of points subject to vibrational stress which would decrease the stability of the structure.

In the preferred embodiment of the present invention, the arcuate rail member 12 is maintained in a horizontal plane above a bass drum via not only two uprights, but also via at least one bass drum assembly 100 consisting of one bass arm member 50 attached to a bass drum 105. Alternatively, the bass drum can be attached more directly to the rail member via an attaching element. The uprights 20, 21 and the at least one bass drum assembly 100 support the arcuate rail member 12 by being placed at variable locations along the length of the arcuate rail member 12.

Figures 1B, 1C:
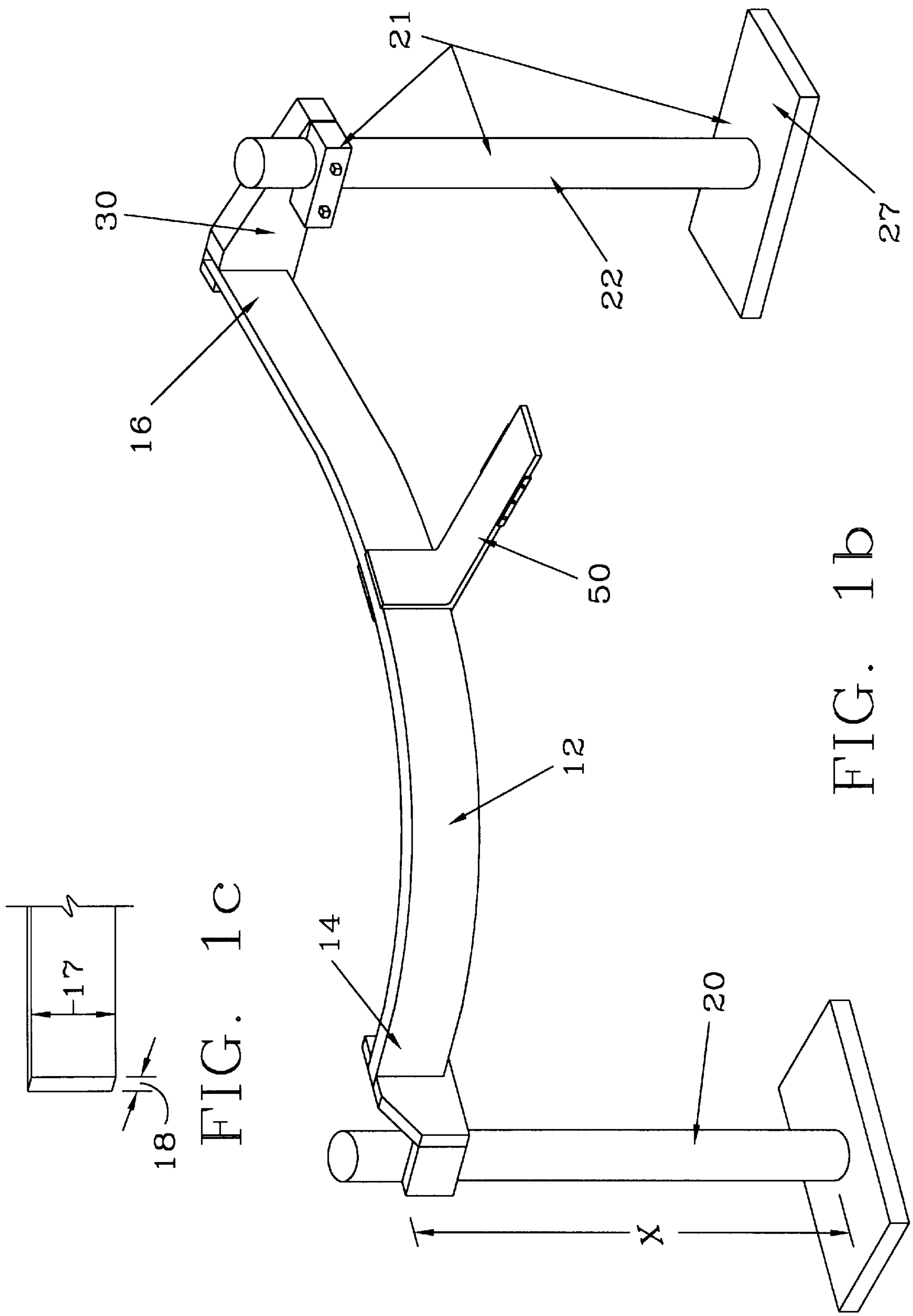
Figure 2B:
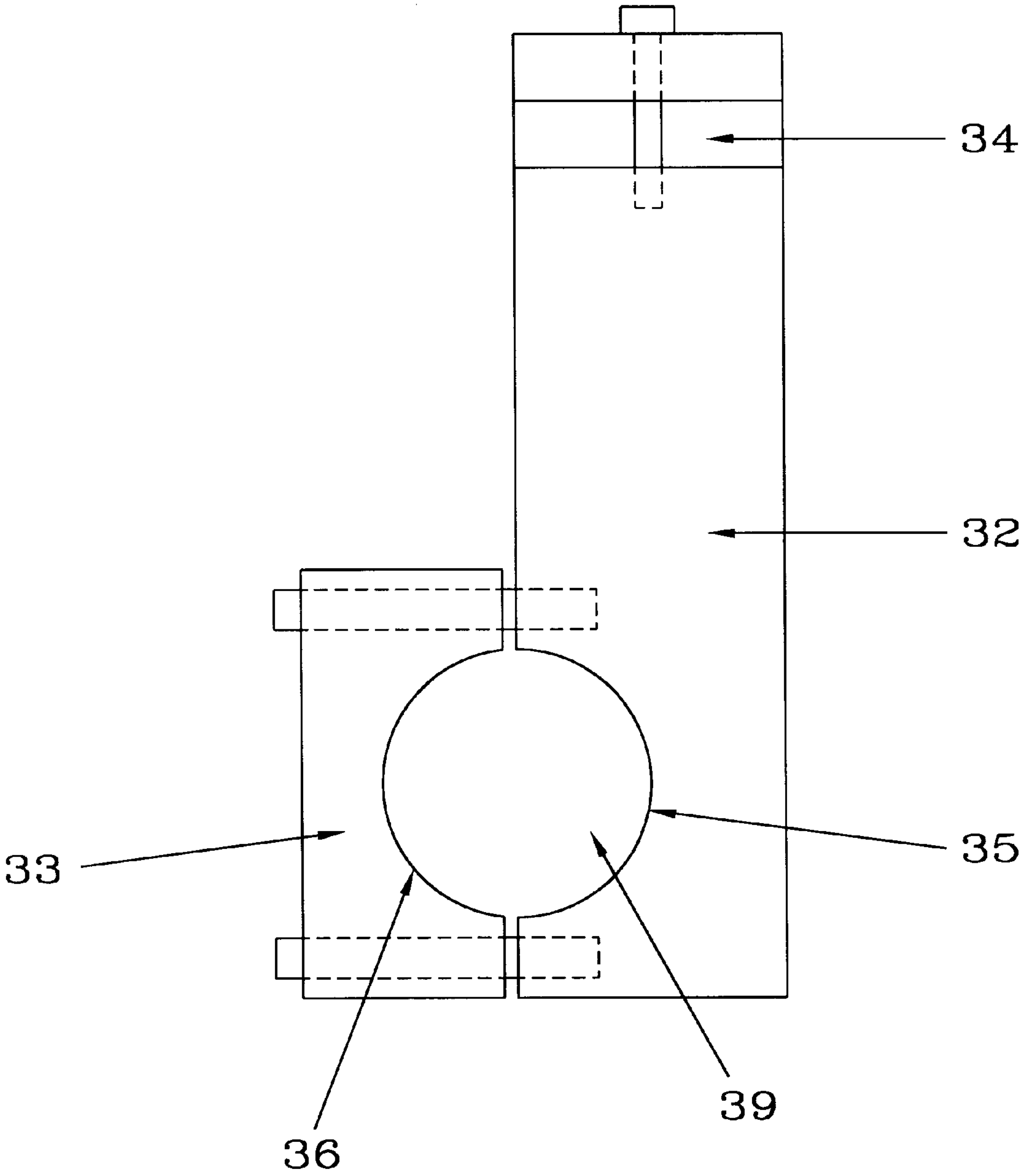
FIG. 2*b* is a top view of the rail affixing member which is attached to the upright in FIG. 2*a*.
Figure 3A:
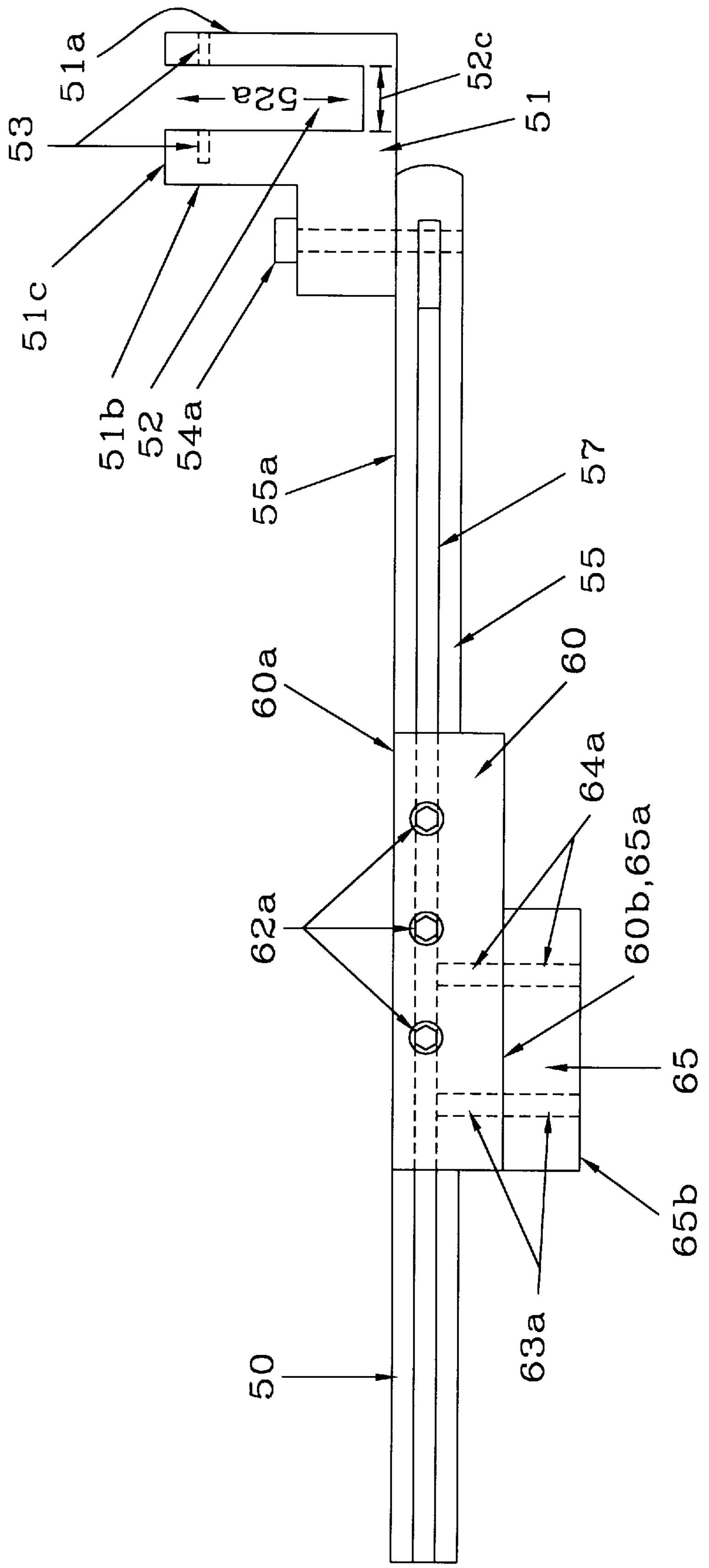
FIG. 3*a* is a side view of a bass arm member with a 360 degree pivot point and with an adjustable length.
Figure 3B:
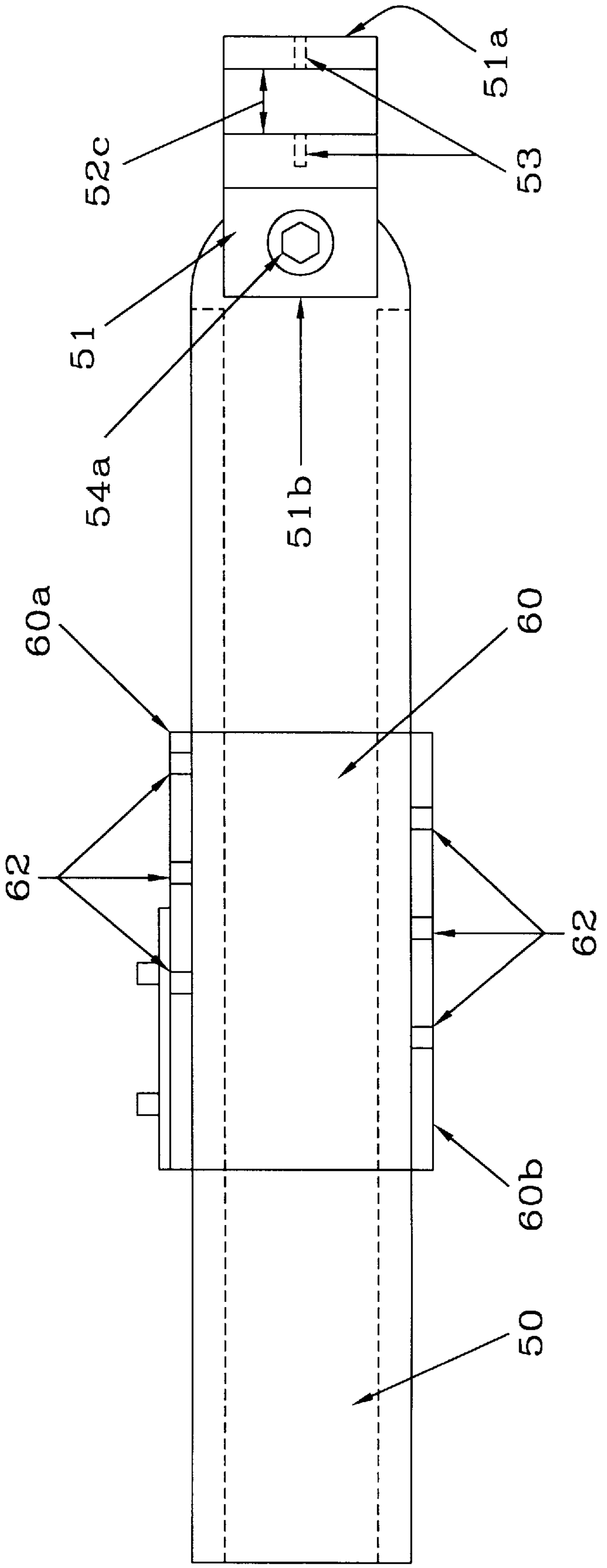
FIG. 3*b* is a top view of a bass arm member with a 360 degree pivot point and of an adjustable length.
Figure 3C:
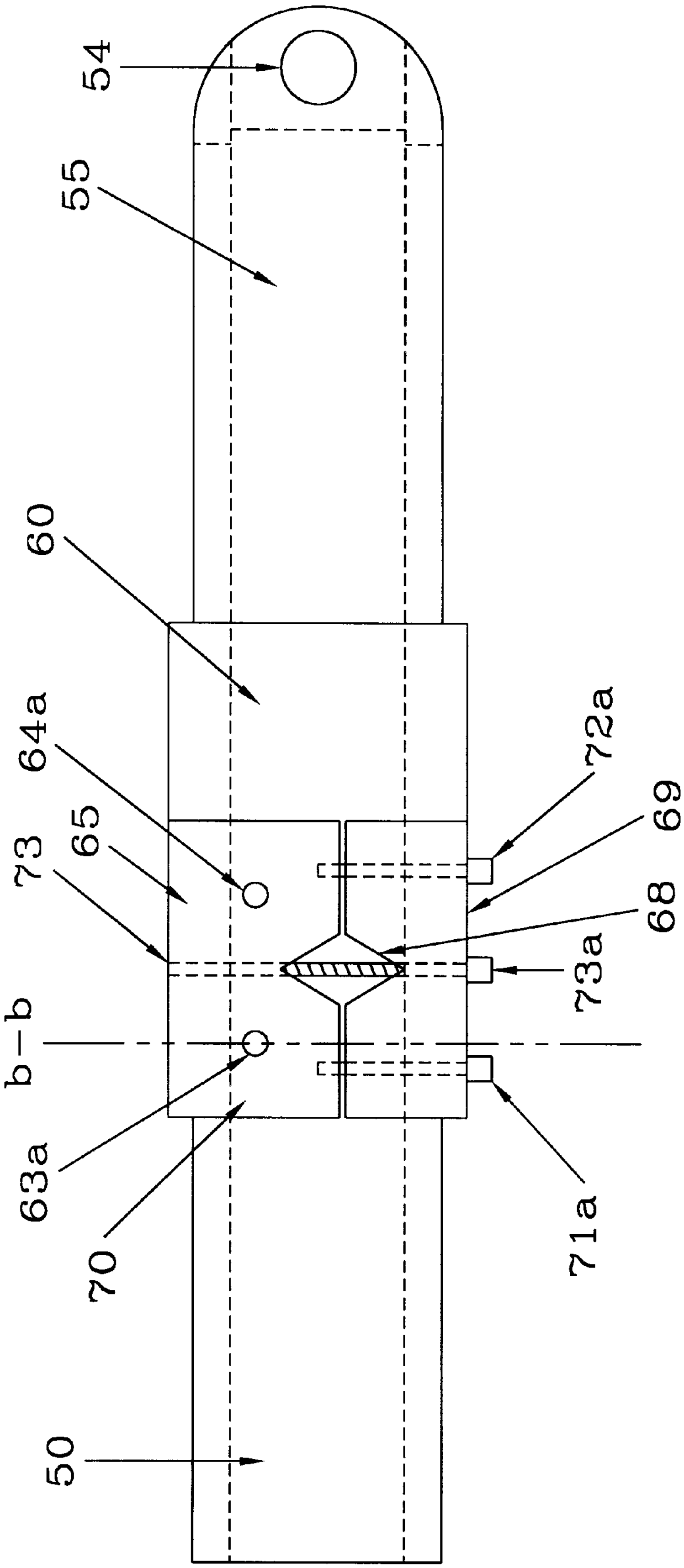
FIG. 3*c* is a bottom view of a bass arm member with a 360 degree pivot point and of an adjustable length.
Figure 3D:
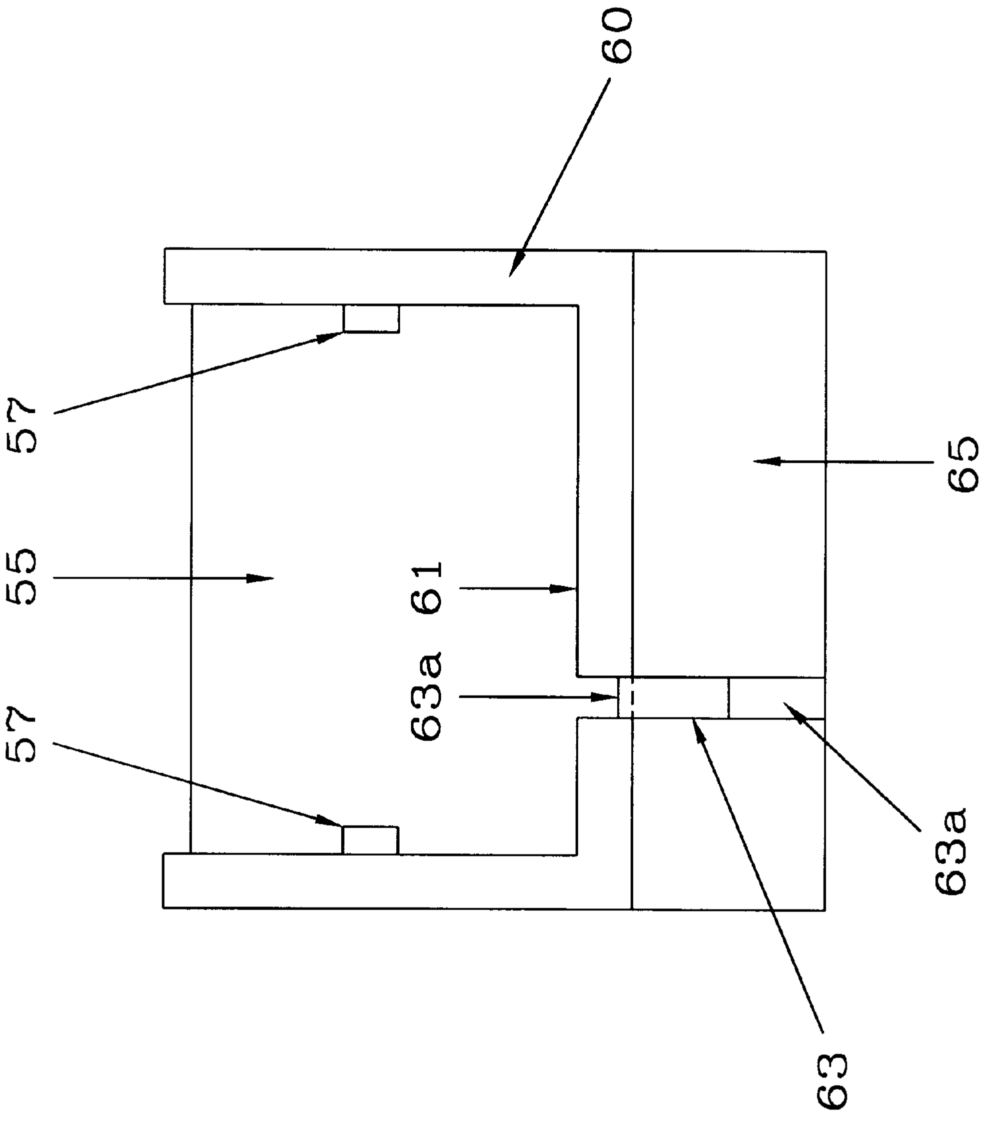
FIG. 3*d* is a cross sectional view along plane b—b of a bass arm member's sliding element as fitted around the bass arm element.

FIG. 1*b* shows the rack for supporting percussion instruments and accessories of the present invention with only one bass drum mounting arm 50, or bass arm member 50, being removably connected to the front region of the rail member 12 of the present invention, support rack, 10 to effect the attachment of a bass drum 105 to act as a support for the rail member. Thus, in FIG. 1, the bass drum assembly 100 forms a frontal support leg whereby the frontal portion of the rail is supported a fixed distance X above the floor surface. Consequently, the bass drum assembly 100 acts in concert with the vertical support members 20, 21 to support the rail member 12 in a substantially horizontal plane, a desired distance X above the floor or support surface. It should be clear to one skilled in the art that the bass drum and vertical supports could serve as a support to the rail member by being placed at any location along the rail member. Further, multiple bass arm members and bass drums could be used to support the rail member.

The preferred embodiment of the bass drum mounting arm or bass arm member 50 of the rail 10 is preferably constructed in a manner shown in FIG. 3*a*, 3*b* , 3*c* and 3*d*. The bass arm member 50 consists of essentially four components: a rail mount element 51, a bass arm element 55, a sliding element 60, and a bass mount element 65. The present invention mount element 51 serves to mount or link the bass arm member 50 to the rail member 12 of the present invention 10, containing, a first linkage means. The rail mount element 51 contains a rectangular groove 52 along the superior side 51*c* of the rail mount element 51. The groove 52 extends downward from the superior side 51*c* of the rail mount element 51. The depth 52*a* of the groove 52 is slightly larger than the height 17 of the rail member 12. The width 52*c* of the groove 52 is roughly the same as, but very slightly larger than, the width 18 of the rail member 12. Hence, the rail member 12 can be lowered into the groove 52 of the rail mount element 51 of the bass arm member 50 will extend out towards the front of the rack for supporting percussion instruments and accessories 12 of the present invention. The benefit of this attachment mechanism is that the rail mount element 51, and consequently the bass drum 105, can be positioned anywhere along the rail member 12. This provides maximum flexibility of bass drum 105 positioning and consequently maximum flexibility for the placement of other percussion instruments which are either attached to the support rack 10 of the present invention or free from but distal to the support rack 10. The rail mount element 51 also has an orifice 53 which passes from the back side 51*a* towards the front surface 51*b* of the rail mount element 51, superior to where the rail member fit into the rectangular groove 52. In effect, the orifice transverses the groove 52 of the rail mount element 51. A screw (not shown) is passed through the orifice 53 from the back side 51*a*, through the groove 52, and back into the rail mount element 51, thereby serving to removably affix the bass arm member 50 to the rail member 12. This attachment mechanism contains a minimal number of components, and thus minimizes the number of points subject to vibrational stress and resulting instability of the structure. This attachment mechanism is also simple, thereby minimizing setup and disassembly time.

The rail mount element 51 has another orifice 54 in front of the groove 52 which transverses the superior side 51*c* and inferior side or bottom 51*d* of the rail mount element 51. A screw 54*a* passes from the superior side 51*c*, through the orifice 54, and screws into the superior side 55*a* of the bass arm element 55 of the bass arm member 50, thereby removably affixing the rail mount element 51 to the bass arm element 55 in a second horizontal plane. Attached this way, the bass arm member can pivot along the rail member in the second horizontal plane. This pivoting allows for even more flexibility in positioning of the bass drum and consequently in positioning of other percussion instruments which are either attached to the support rack of the present invention or free from but distal to the support rack.

The bass arm element 55 has a narrow groove 57 which runs down the middle for the length of both sides of the bass arm element 55. The sliding element 60 of the bass arm member 50 is essentially U-shaped (See FIG. 3*d*) and fits around the bass arm element 55, capable of sliding up and down the length of the bass arm element 55. The length of the bass arm element 55 can range anywhere from 2" to 24". In the preferred embodiment, the length of the bass arm element 55 is 18" long. The sliding element 60 in the preferred embodiment is roughly one third the length of the bass arm element 55, and is 4" in the preferred embodiment. The sliding element also has three orifices 62 on each side which lie in a horizontal plane and which transverse the sides 60*a*, 60*b* of the U-shaped sliding element 60; see FIG. 3*b*. In the preferred embodiment, the holes transversing either side of the sliding element are staggered. The sliding element 60 is moved along the bass arm element 55 until the desired bass arm member 50 length is reached, at which time a screw 62*a* is inserted into each orifice 62 so as to transverse the orifices and apply pressure against the bass arm element; the screws 62*a* lie perpendicular to and fit inside the narrow groove 57 which runs down the middle for the length of both sides 55*a*, 55*b* of the bass arm element 55 and apply pressure at the bottom of the groove. Thus, the sliding element 60 is removably affixed to the chosen location of the bass arm element 55 and the length of the bass arm member 50 is fixed. By providing a bass arm member with an adjustable length, the invention gives even more flexibility in positioning of the bass drum and consequently in positioning of other percussion instruments which are either attached to the support rack of the present invention or free from but distal to the support rack.

The final component of the bass arm member 50, the bass mount element 65, makes up a second linkage means which serves to link the bass drum 105 to the sliding element 60 which is affixed to the bass arm element 55 of the bass arm member 50. The bass mount element 65 is attached to the sliding element via two screws 63, 64. Both the sliding element and the bass mount element have two orifices 63*a*, 64*a* which traverse from their superior side 60*a*, 65*a* to their inferior side 60*b*, 65*b*. The orifices of the sliding element lie within its groove 61, or the bottom of its U-shaped structure. When the holes of the two elements are aligned, two screws 63, 64 (not shown) are inserted through the two orifices 63*a*, 64*a* from the superior side of the sliding element, and into two orifices 63, 64 on the superior side of the bass mount element 65*a*, thereby removably attaching the bass mount element 65 to the sliding element 60. The bass mount element 65 is halved by a cut along the vertical axis, along the length of the bass arm element 55, into a first and second segment 69, 70. The cut bisects a diamond shaped orifice 68 which transverses the bass mount element from its inferior side 65*b* to the superior side 65*a*. This diamond shaped orifice 68 serves as a connective fitting for a bass drum 105. The bass drum 95 is removably attached to the bass mount element 65. Three screws 71*a*, 72*a*, 73*a* pass through three orifices 71, 72, 73 aligned in a horizontal plane which transverse the first segment 69 of the bass mount element 65 and extend into three orifices (not shown) in the second segment 70 of the bisected bass mount element 65. The central orifice 73 extends through the diamond-shaped orifice 68 and into the second segment. The affixing member of the bass drum (not shown) also contains an orifice which transverses along a horizontal plane. After the affixing member of the bass drum is inserted into the diamond orifice, the screws 71*a*, 72*a*, 73*a* are inserted and tightened, the central screw passing through the first element 69, the bass drum affixing member, and into the second element 70, thereby removably affixing the bass drum 105 to the bass arm member 50 and forming the bass drum assembly 100.

The bass drum assembly 100 can then be attached to the desired location along the length of the arcuate rail member 12, and in conjunction with the uprights 20, 21, support the rail member 12 in a horizontal plane.

Figure 4:
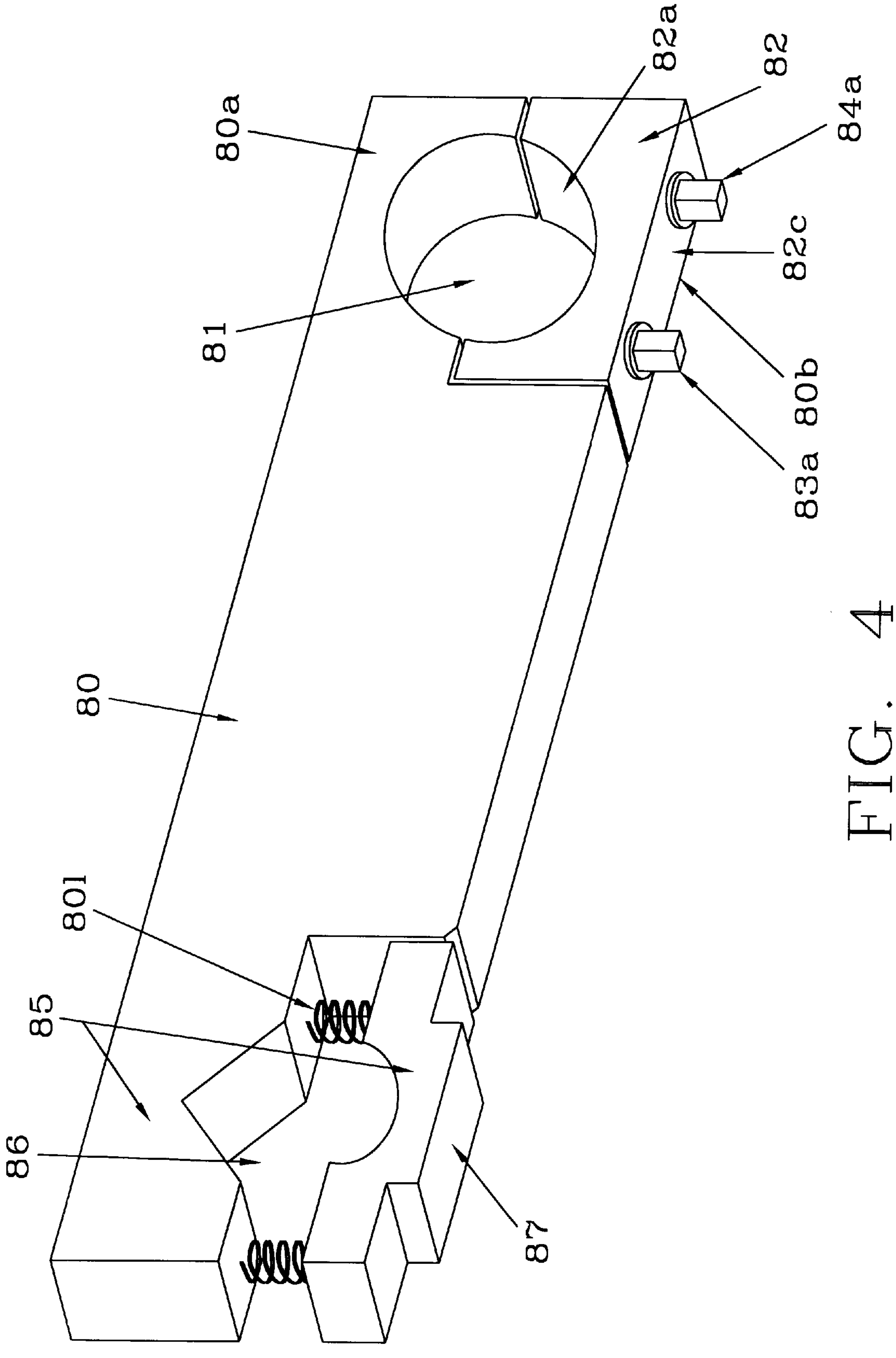
FIG. 4 is an exploded side view of an upright instrument-accessory support means which attaches to a leg, or vertical support member, of an upright of the present invention, thereby providing a means for supporting additional percussion instruments and accessories.

The preferred embodiment of the present invention also has at least one upright instrument-accessory support means, called an extension bar 80, which is removably attached to either one of the uprights 20, 21. FIG. 4 is an exploded side view of an extension bar 80 which attaches to one of the uprights 20, 21, of the present invention 10, thereby providing a means for supporting additional percussion instruments and accessories. The extension bar 80 is partially split by a longitudinal cut roughly one fourth its length which extends down the midline 80L. The longitudinal cut halves a circular orifice 81 which traverses the extension bar from the superior side 80*a* to the inferior side 80*b*. The circular orifice 81 has a cross section that is slightly smaller than the cross section A of the vertical support members of the uprights. A transverse cut intersects but does not extend beyond the length of the longitudinal cut, to create a removable extension bar block 82 with a half circle groove 82*a*. Two circular orifices 83, 84 (not shown), which begin on the side 82*c* of the removable block 82 opposite the circular groove 82*a*, transverse the removable extension block 82 and pass into the "mother" extension member 80. The orifices 83, 84 lie on either side of the half circle groove 82*a*. The two half circle grooves of the two portions of the extension bar 80, 82 are fit around a vertical support member 22 of an upright 20, 21. Two screws 83*a*, 84*a* are then passed through the circular orifices 83, 84 on the removable block 82 and are inserted into the mother portion of the extension member 80. Thus, on tightening the screws 83*a*, 84*a*, the extension block 80 is removably fixed to the vertical support member 22 of the uprights.

On the end of the extension block 80 distal to the vertical support member 22 is a means 85 for attaching a percussion instrument or other accessory support rack. The instrument-accessory support means can be comprised of a similarly formed block 87, created by an analogous intersecting longitudinal and transverse cut, the longitudinal cut halving an orifice 86 which traverses the extension bar from the superior side 80*a* to the inferior side 80*b*. The block can be adjustably fastened by any fastening means 88 so as to be able to support a piece of equipment or percussion instrument, although in the preferred embodiment, screws are used. This system is highly advantageous in that it allows the percussionist to position the extension bar anywhere along the vertical support member, thereby providing maximum flexibility for positioning of percussion instruments and other equipment. This is especially useful for the attachment of Floor Toms, which are positioned lower than most other drums.

Figure 5:
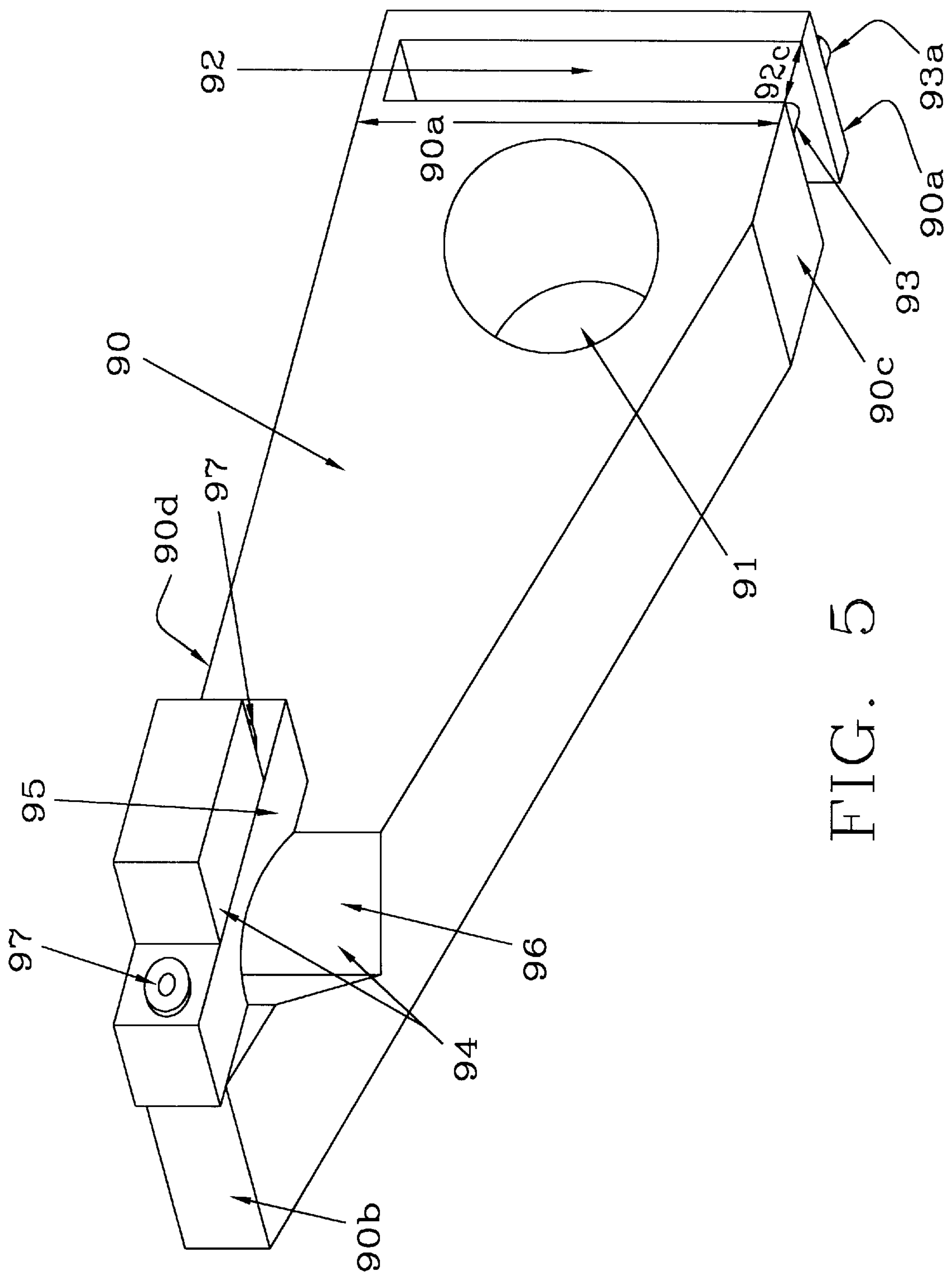
FIG. 5 is an exploded side view of a rail instrument-accessory support means, having a microphone cable port, which attaches to the horizontal rail, of the present invention.

Finally, the preferred embodiment of the present invention 10 may have at least one rail instrument-accessory support means on the rail member 12 to support percussion instruments and accessories. FIG. 5 is an exploded front view of such a rail instrument-accessory support means 90, or accessory clamp 90, with a microphone cable port 91, which attaches to the rail member 12, of the present invention 10. The accessory clamp 90 contains a rectangular groove 92 along the inferior side 90*c* of the accessory clamp 90. The groove 92 extends upward from the inferior side 90*c* of the accessory clamp 90. The height 92*a* of the groove 92 is slightly larger than the height 17 of the rail member 12. The width 92*c* of the groove 92 is roughly the same as the width 18 of the rail member 12. Hence, the accessory clamp 90 can be lowered onto the rail member 12 of the rack for supporting percussion instruments and accessories of the present invention. The accessory clamp 90 also has an orifice 93 (not shown) which passes from the dorsal surface 90*a* towards the ventral surface 90*b* of the accessory clamp 90, extending across the groove 92 of the accessory clamp 90. A screw 93*a* is passed through the orifice 93*b* from the ventral side 90*a*, through the groove 92, and back into the accessory clamp 90, and tightened, thereby serving to removably affix the accessory clamp 90 to the rail member 12. This attachment setup is highly advantageous in that it allows the accessory clamp to be positioned anywhere along the rail member, thereby providing maximum flexibility for percussion and other equipment positioning.

A circular orifice 91 transverses the accessory clamp 90 laterally, and can serve as cable port. Distal to the groove 92 and the orifice 91 is an attachment means 94 for attaching a percussion instrument or other accessory to the support rack. The attachment means 94 of the accessory clamp 85, can be similar to that 85 of the extension member 80. The attachment means 94 can be comprised of a block 95 created similarly to the blocks created on the extension member 80, by intersecting longitudinal and transverse cuts, the longitudinal cut halving an orifice 96 which traverses the accessory clamp 90 from the superior side 90*c* to the inferior side 90*d*. The block 95 can be adjustably fastened to the accessory clamp 90 by fastening means 97 so as to be able to support a piece of equipment or percussion instrument. As with the attachment mechanism for the bass arm member to the rail member, and the upright to the rail member, the rail instrument-accessory support means attachment mechanism contains a minimal number of components, and thus minimizes the number of points subject to vibrational stress and consequential structural instability. This attachment mechanism is also simple, thereby minimizing setup and disassembly time.

The cable port 91 of the accessory clamp 90 in conjunction with the flat rail member 12 provide an excellent means for neatly organizing cables and wires of electrical equipment and for keeping these cables out of sight, thus providing a visually appealing, uncluttered percussion setup.

The placement of accessory clamps 90 at the ends of the rail member 12 provides yet another distinguishing advantage to the present invention. As stated earlier, in the present invention, the arcuate rail member 12 is maintained in a horizontal plane above a bass drum 105 via two uprights 20, 21 and at least one bass arm member 100 attached to a bass drum 105. The uprights 20, 21 and the at least one bass drum assembly 100 support the arcuate rail member 12 by being placed at variable locations along the length of the arcuate rail member 12. Because the uprights 20, 21 and the bass drum assembly 100 are not necessarily at the ends of the rail member 12, an accessory clamp 90 may be positioned on the end of the rail member 12 for supporting desired percussion instruments and accessories. Under the prior art, the positioning of such equipment is difficult, if not impossible, do to the presence and interference of support legs.

Generally, the invention relates to a rack for supporting percussion instruments and accessories for use in combination with, and partially supported by at least one bass drum, said rack comprising: a vertically flat, generally horizontally extending arcuate rail member; a first upright providing a first attachment point to the rail member; a second upright providing a second attachment point to the rail member; a bass drum; and a linkage means for releasably securing the bass drum to the rail member so that the uprights and bass drum serve to maintain the rail member on a horizontal plane above the bass drum. More specifically, the support rack has at least one rail instrument-accessory support means containing a cable port attached to the rail member, and may additionally have at least one upright instrument-accessory support means is attached to the support member. The rack may have a second vertically flat, horizontally extending rail for supporting percussion instruments and accessories. More specifically, the support rack's rail member has a cross-sectional height to width ratio of at least 4:1, preferably 10:1, and most preferably 8:1, and the rail member describes an arc of from 40% to 90%.

The invention also relates to a rack for supporting percussion instruments and accessories to be used in combination with and partially supported by at least one bass drum, said rack comprising a vertically flat, generally horizontally extending arcuate rail member; a first upright providing a first releasable point of attachment to the rail member; a second upright providing a second releasable point of attachment to the rail member; a bass drum; and a bass arm member having a first bass arm end providing a third point of attachment to the rail member and a second bass arm end providing a point of attachment to the bass drum such that the two uprights and the bass drum, which is attached to the rail member by the bass arm member, maintain the rail member on a horizontal plane above the bass drum. The support rack may further at least one rail instrument-accessory support means attached to the rail member. Alternatively, at least one upright instrument-accessory support means can be attached to one of the uprights. Alternatively, the rail may be supported by at least two bass drums and bass arm members. Alternatively, the bass arm member may be either pivotable along the point of attachment to the rail member, or of an adjustable length.

The invention also relates to a rack for supporting percussion instruments and accessories to be used in combination with and partially supported by at least one bass drum, said rack comprising a vertically flat, generally horizontally extending arcuate rail member; a first upright providing a first releasable point of attachment to the rail member; a second upright providing a second releasable point of attachment to the rail member; a bass drum; and a bass arm member having a first bass arm end providing a third point of attachment to the rail member and a second bass arm end providing a point of attachment to the bass drum such that the two uprights and the bass drum, which is attached to the rail member by the bass arm member, maintain the rail member on a horizontal plane above the bass drum, and where the bass arm member is pivotable along the point of attachment to the rail member for pivoting the bass arm member in on a horizontal plane. Alternatively, at least one upright and/or rail support means can be attached to the upright or rail member respectively.

The invention further relates to a rack for supporting percussion instruments and accessories to be used in combination with and partially supported by at least one bass drum, said rack comprising a vertically flat, generally horizontally extending arcuate rail member; a first upright providing a first releasable point of attachment to the rail member; a second upright providing a second releasable point of attachment to the rail member; a bass drum; and a bass arm member having a first bass arm end providing a third point of attachment to the rail member and a second bass arm end providing a point of attachment to the bass drum such that the two uprights and the bass drum, which is attached to the rail member by the bass arm member, maintain the rail member on a horizontal plane above the bass drum, and where the bass arm member is pivotable along the point of attachment to the rail member for pivoting the bass arm member in on a horizontal plane and the length of the bass arm member is adjustable between an extended and a retracted condition. Alternatively, at least one upright and/or rail support means can be attached to the upright or rail member respectively.

The foregoing detailed description and the accompanying drawings are provided for purposes of describing and illustrating presently preferred embodiments of the invention. It is understood that the present disclosure of the preferred form has been made only by way of example, and that numerous changes in the details of structures and the composition of the system may be resorted to without departing from the spirit and scope of this invention.

Now that the invention has been described,

What is claimed is:

1. A rack for supporting percussion instruments and accessories for use in combination with, and partially supported by at least one bass drum, the rack comprising:

a vertically flat, generally horizontally extending arcuate rail member;

a first upright providing a first attachment point to the rail member;

a second upright providing a second attachment point to the rail member;

a bass drum;

a linkage means for releasably securing the bass drum to the rail member so that the uprights and the bass drum serve to maintain the rail member on a horizontal plane above the bass drum; and wherein at least one rail instrument-accessory support means containing a cable port is attached to the rail member and wherein at least one upright instrument-accessory support means is attached to the support member.

2. The support rack of claim 1, wherein said rail describes an arcuate configuration of from 40° to 90°.

3. A rack for supporting percussion instruments and accessories for use in combination with, and partially supported by at least one base drum, the rack comprising:

a vertically flat, generally horizontally extending arcuate rail member;

a first upright providing a first attachment point to the rail member;

a second upright providing a second attachment point to the rail member;

a bass drum;

a linkage means for releasably securing the bass drum to the rail member so that the uprights and the bass drum serve to maintain the rail member on a horizontal plane above the bass drum; and wherein said rail member has a cross-sectional height to width ratio of at least 4:1.

4. A rack for supporting percussion instruments and accessories for use in combination with, and partially supported by at least one bass drum, the rack comprising:

a vertically flat, generally horizontally extending arcuate rail member;

a first upright providing a first attachment point to the rail member;

a second upright providing a second attachment point to the rail member;

a bass drum;

a linkage means for releasably securing the bass drum to the rail member so that the uprights and the bass drum serve to maintain the rail member on a horizontal plane above the bass drum; and wherein said rail member has a cross-sectional height to width ratio of at least 10:1.

5. A rack for supporting percussion instruments and accessories in combination with and Partially supported by at least one bass drum, said rack comprising:

a vertically flat, generally horizontally extending arcuate rail member;

a first upright providing a first releasable point of attachment to the rail member;

a second upright providing a second releasable point of attachment to the rail member;

a bass drum;

a bass arm member having a first bass arm end providing a third point of attachment to the rail member and a second bass arm end providing a point of attachment to the bass drum such that the two uprights and the bass drum, which is attached to the rail member by the bass arm member, maintain the rail member on a horizontal plane above the bass drum; and wherein at least one rail instrument-accessory support means is attached to the rail member.

6. The support rack of claim 5, wherein at least one upright instrument-accessory support means is attached to one of the uprights.

7. The support rack of claim 5, wherein the bass arm member has a length which is adjustable between an extended and a retracted condition.

8. The support rack of claim 5, wherein the bass arm member is pivotable along the point of attachment to the rail member for pivoting the bass arm member on a horizontal plane.

9. The support rack of claims 8, wherein at least one upright instrument-accessory support means is attached to the rail member.

10. The support rack of claim 8, wherein at least one rail instrument-accessory support means is attached to the rail member.

11. The support rack of claim 10, wherein at least one upright instrument-accessory support means is attached to the rail member.

12. The support rack of claim 8, wherein the bass arm member has a length which is adjustable between an extended and a retracted condition.

13. The support rack of claim 12 wherein at least one rail instrument/accessory support means is attached to the rail member.

14. The support rack of claim 12, wherein at least one upright instrument-accessory support means is attached to the rail member.

15. The support rack of claim 14, wherein at least one rail instrument/accessory support means is attached to the rail member.

* * * * *